United States Patent
Chen et al.

(10) Patent No.: US 9,733,450 B2
(45) Date of Patent: Aug. 15, 2017

(54) LENS ASSEMBLY

(71) Applicants: AO Ether Optronics (Shenzhen) Limited, Shenzhen, Guandong Province (CN); AO Ether Corporation, Taichung (TW)

(72) Inventors: Bo-Yan Chen, Taichung (TW); Hsi-Ling Chang, Taichung (TW)

(73) Assignees: AO ETHER OPTRONICS (SHENZHEN) LIMITED, Shenzhen, Guandong Province (CN); AO ETHER CORPORATION, Taichung (TW)

( * ) Notice: Subject to any disclaimer, the term of this patent is extended or adjusted under 35 U.S.C. 154(b) by 0 days.

(21) Appl. No.: 15/213,528

(22) Filed: Jul. 19, 2016

(65) Prior Publication Data
US 2017/0023773 A1    Jan. 26, 2017

(51) Int. Cl.
G02B 9/60 (2006.01)
G02B 13/18 (2006.01)
G02B 13/00 (2006.01)

(52) U.S. Cl.
CPC ........... *G02B 9/60* (2013.01); *G02B 13/0045* (2013.01)

(58) Field of Classification Search
CPC ... G02B 9/60; G02B 9/62; G02B 9/64; G02B 13/0045
USPC ......... 359/708–714, 745, 746, 754–757, 763
See application file for complete search history.

(56) References Cited

U.S. PATENT DOCUMENTS

| 2010/0253829 A1* | 10/2010 | Shinohara | .......... G02B 13/0045 348/340 |
| 2016/0109686 A1* | 4/2016 | Lin | .................... G02B 13/0045 348/373 |

* cited by examiner

Primary Examiner — Darryl J Collins
(74) Attorney, Agent, or Firm — McClure, Qualey & Rodack, LLP

(57) ABSTRACT

A lens assembly comprises sequentially from an object side to an image side along an optical axis a first lens, a second lens, a stop, a third lens, a fourth lens and a fifth lens. The first lens is a biconvex lens with positive refractive power. The second lens is a meniscus lens with negative refractive power and the convex surface of second lens faces the object side. The third lens is a meniscus lens with negative refractive power and the convex surface of third lens faces the object side. The fourth lens is a meniscus lens with positive refractive power and the concave surface of fourth lens faces the object side. The fifth lens is a biconcave lens with negative refractive power. The lens assembly satisfies the following condition: $1.10 < D_{L1}/D_{ST} < 10.90$, wherein $D_{L1}$ is an effective diameter of the first lens and $D_{ST}$ is an effective diameter of the stop.

12 Claims, 12 Drawing Sheets

LENS ASSEMBLY

BACKGROUND OF THE INVENTION

Field of the Invention

The invention relates to a lens assembly.

Description of the Related Art

Digital still cameras and mobile phones have been continually developed toward high pixel number and miniaturization. Therefore, the requirements for lens assemblies with miniaturization and high resolution are greatly increased. The well-known lens assembly with five lens

BRIEF SUMMARY OF THE INVENTION

The invention provides a lens assembly to solve the above problems. The lens assembly of the invention, provided with characteristics of a shortened total lens length, still has a good optical performance and can meet a requirement or resolution.

The lens assembly in accordance with the invention comprises a first lens, a second lens, a stop, a third lens, a fourth lens and a fifth lens, all of which are arranged in sequence from an object side to an image side along an optical axis. The first lens is a biconvex lens with positive refractive power. The second lens is a meniscus lens with negative refractive power and includes a convex surface facing the object side and concave surface facing the image side. The third lens is a meniscus lens with negative refractive power and includes a convex surface facing the object side and a concave surface facing the image side. The fourth lens is a meniscus lens with positive refractive power and includes a concave surface facing the object side and a convex surface facing the image side. The fifth lens is a biconcave lens with negative refractive power. The lens assembly satisfies the following condition: $1.10 < D_{L1}/D_{ST} < 10.90$, wherein $D_{L1}$ is an effective diameter of the first lens and $D_{ST}$ is an effective diameter of the stop.

The lens assembly satisfies $1.10 < D_{L1}/D_{L2} < 1.35$, wherein $D_{L1}$ is an effective diameter of the first lens and $D_{L2}$ is an effective diameter of the second lens.

The lens assembly satisfies $Vd_1 > Vd_2$, $Vd_1 > Vd_3$, $Vd_4 > Vd_2$, $Vd_4 > Vd_3$, $Vd_5 > Vd_2$, $Vd_5 > Vd_3$, wherein $Vd_1$ is an Abbe number of the first lens, $Vd_2$ is an Abbe number of the second lens, $Vd_3$ is an Abbe number of the third lens, $Vd_4$ is an Abbe number of the fourth lens and $Vd_5$ is an Abbe number of the fifth lens.

The lens assembly satisfies $Vd_1 > 40$, $Vd_2 < 40$, $Vd_5 > 40$, wherein $Vd_1$ is the Abbe number of the first lens, $Vd_2$ is the Abbe number of the second lens and $Vd_5$ is the Abbe number of the fifth lens.

The lens assembly satisfies $Vd_3 < 40$, $Vd_4 > 40$, wherein $Vd_3$ is the Abbe number of the third lens and $Vd_4$ is the Abbe number of the fourth lens.

The third lens and the fourth lens satisfies $15 \leq Vd_4 - Vd_3 < 43.61$, wherein $Vd_3$ is the Abbe number of the third lens and $Vd_4$ is the Abbe number of the fourth lens.

The first lens, the third lens and the fourth lens satisfies $-1.3 < f/f_3 + f/f_4 - f/f_1 < -0.1$, wherein f is an effective focal length of the lens assembly, $f_1$ is an effective focal length of the first lens, $f_3$ is an effective focal length of the third lens and $f_4$ is an effective focal length of the fourth lens.

The lens assembly satisfies $0.6 < SL/TTL < 0.87$, wherein SL is an interval from the stop to the image plane along the optical axis and TTL is an interval from an object side surface of the first lens to the image plane along the optical axis.

The fourth lens is made of glass material.

The first lens is made of plastic material, the second lens is made of plastic material, the third lens is made of plastic material and the fifth lens is made of plastic material.

The stop includes an optical opening, wherein the diameter of the optical opening can be changed so as to make the effective diameter of the stop change.

The lens assembly satisfies $1.4 \leq F \leq 13$, wherein F is a F-number of the lens assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
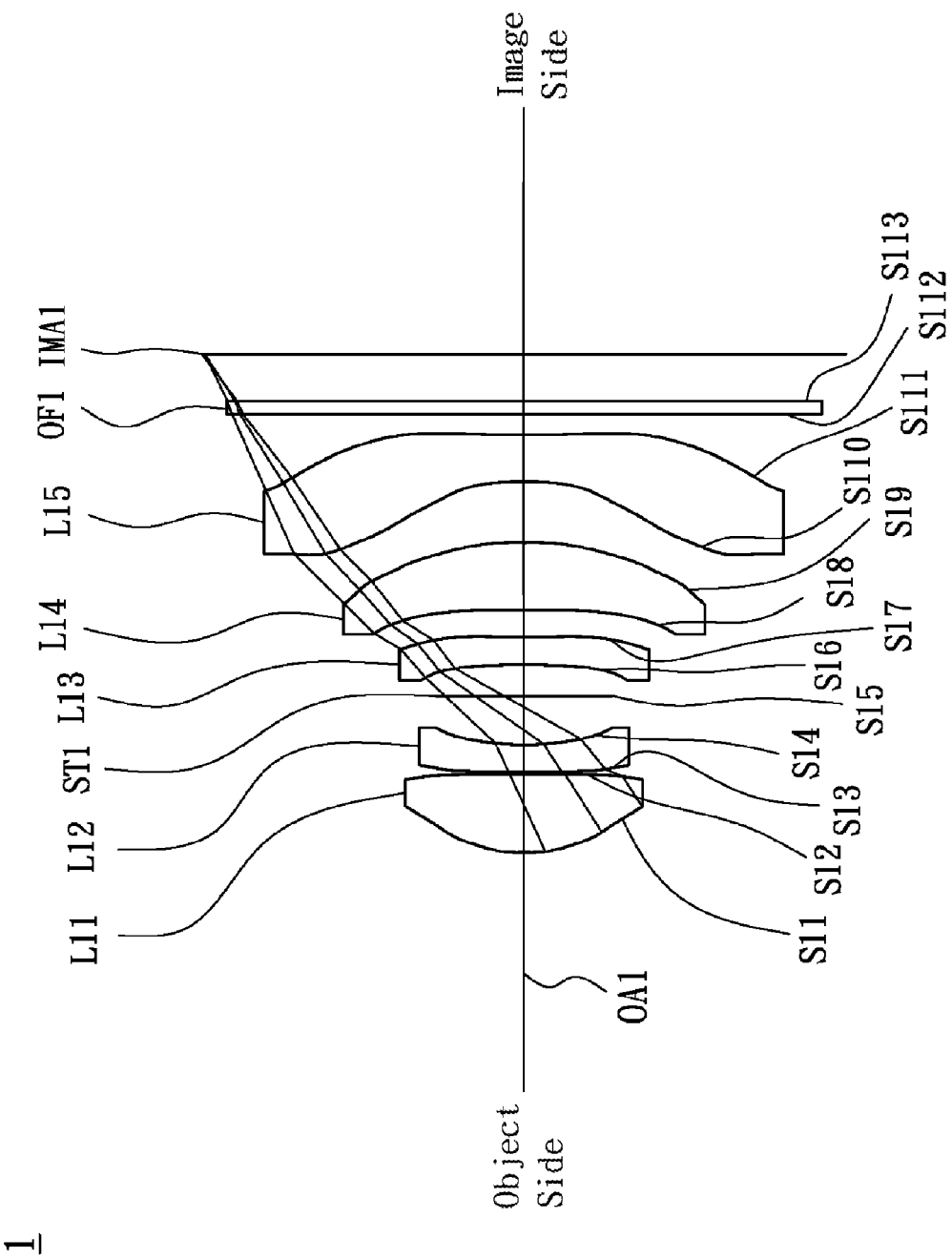
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a first lens L11, a second lens L12, a stop ST1, a third lens L13, a fourth lens L14, a fifth lens L15 and an optical filter OF1, all of which are arranged in sequence from an object side to an image side along an optical axis OA1. In operation, an image of light rays from the object side is formed at an image plane 1. The first lens L11 is with positive refractive power and made of plastic material, wherein the object side surface S11 is a convex surface, the image side surface S12 is a convex surface and both of the object side surface S11 and image side surface S12 are aspheric surfaces. The second lens L12 is with negative refractive power and made of plastic material, wherein the object side surface S13 is a convex surface, the image side surface S14 is a concave surface and both of the object side surface S13 and image side surface S14 are aspheric surfaces. The third lens L13 is with negative refractive power and made of plastic material, wherein the object side surface S16 is a convex surface, the image side surface S17 is a concave surface and both of the object side surface S16 and image side surface S17 are aspheric surfaces. The fourth lens L14 is with positive refractive power and made of glass material, wherein the object side surface S18 is a concave surface, the image side surface S19 is a convex surface and both of the object side surface S18 and image side surface S19 are aspheric surfaces. The fifth lens L15 is with negative refractive power and made of plastic material, wherein the object side surface S110 is a concave surface, the image side surface S111 is a concave surface and both of the object side surface S110 and image side surface S111 are aspheric surfaces. Both of the object side surface S112 and image side surface S113 of the optical filter OF1 are plane surfaces. In the first embodiment, Abbe number of the first lens L11, the fourth lens L14 and the fifth lens L15 are greater than Abbe number of the second lens L12 and the third lens L13.

In order to maintain excellent optical performance of the lens assembly in accordance with the first embodiment of the invention, the lens assembly 1 must satisfy the following eleven conditions:

$$1.10 < D1_{L11}/D1_{ST1} < 10.90 \quad (1)$$

$$1.10 < D1_{L11}/D1_{L12} < 1.35 \quad (2)$$

$$Vd1_1 > 40 \quad (3)$$

$$Vd1_2 < 40 \quad (4)$$

$$Vd1_3 < 40 \quad (5)$$

$$Vd1_4 > 40 \quad (6)$$

$$Vd1_5 > 40 \quad (7)$$

$$-1.3 < f1/f1_3 + f1/f1_4 - f1/f1_1 < -0.1 \quad (8)$$

$$15 \leq Vd1_4 - Vd1_3 < 43.61 \quad (9)$$

$$0.6 < SL1/TTL1 < 0.87 \quad (10)$$

$$1.4 \leq F1 \leq 13 \quad (11)$$

wherein $D1_{L11}$ is an effective diameter of the first lens L11, $D1_{L12}$ is an effective diameter of the second lens L12, $D1_{ST1}$ is an effective diameter of the stop ST1. A straight length of the effective diameter $D1_{L11}$ of the first lens L11 means from an edge of the first lens L11 through a center point of the first lens L11 to the other edge. A straight length of the effective diameter $D1_{L12}$ of the second lens L12 means from an edge of the second lens L12 through a center point of the second lens L12 to the other edge. The effective diameter $D1_{ST1}$ of the stop ST1 means a diameter of optical opening of the stop ST1. $Vd1_1$ is an Abbe number of first lens L11, $Vd1_2$ is an Abbe number of second lens L12, $Vd1_3$ is an Abbe number of third lens L13, $Vd1_4$ is an Abbe number of fourth lens L14, $Vd1_5$ is an Abbe number of fifth lens L15, f1 is an effective focal length of the lens assembly 1, $f1_1$ is an effective focal length of the first lens L11, $f1_3$ is an effective focal length of the third lens L13, $f1_4$ is an effective focal length of the fourth lens L14, SL1 is an interval from the stop ST1 to the image plane IMA1 along the optical axis OA1, TTL1 is an interval from an object side surface S11 of the first lens to the image plane IMA1 along the optical axis OA1.

By the above design of the lenses and stop ST1, the lens assembly 1 is provided with a shortened total lens length, an effective corrected aberration and an increased resolution.

In order to achieve the above purposes and effectively enhance the optical performance, the lens assembly 1 in accordance with the first embodiment of the invention is provided with the optical specifications shown in Table 1, which include the effective focal length, F-number, total lens length, radius of curvature of each lens surface in mm, thickness between adjacent surface in mm, refractive index of each lens and Abbe number of each lens. Table 1 shows that the effective focal length is equal to 4.914 mm, F-number is equal to 1.6, total lens length is equal to 5.515 mm, field of view is equal to 120°, effective diameter of the first lens L11 is equal to 2.68 mm, effective diameter of the second lens L12 is equal to 2.030 mm and effective diameter of the stop ST1 is equal to 1.998 mm for the lens assembly 1 of the first embodiment of the invention.

TABLE 1

Effective Focal Length = 4.914 mm  F-number = 1.6
Total Lens Length = 5.515 mm  field of view = 120°
effective diameter of the first lens L11 = 2.68 mm
effective diameter of the second lens L12 = 2.030 mm
effective diameter of the stop ST1 = 1.998 mm

| Surface Number | Radius of Curvature (mm) | Thickness (mm) | Nd | Vd | Remark |
|---|---|---|---|---|---|
| S11 | 1.768392 | 0.88 | 1.53 | 56.1 | The First Lens L11 |
| S12 | −15.8212 | 0.016 | | | |
| S13 | 78.15854 | 0.302841 | 1.65 | 21.5 | The Second Lens L12 |
| S14 | 3.647587 | 0.538276 | | | |
| S15 | ∞ | 0.339278 | | | Stop ST1 |
| S16 | 69.30394 | 0.310414 | 1.65 | 21.5 | The Third Lens L13 |
| S17 | 8.059585 | 0.298384 | | | |
| S18 | −59.6721 | 0.758629 | 1.85 | 40.3 | The Fourth Lens L14 |
| S19 | −3.19383 | 0.672237 | | | |
| S110 | −2.52244 | 0.499967 | 1.53 | 56.1 | The Fifth Lens L15 |
| S111 | 6.620541 | 0.24 | | | |

TABLE 1-continued

| | | | |
|---|---|---|---|
| S112 | ∞ | 0.145 | Optical Filter OF1 |
| S113 | ∞ | 0.514626 | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C |
|---|---|---|---|---|
| | D | E | F | G |
| S11 | −0.54105 | 0.009829374 | 0.000971779 | −0.006244744 |
| | 0.007262122 | −0.003886691 | 2.14E−05 | −6.99E−07 |
| S12 | 107.373 | 0.024638449 | 0.004349484 | −0.0178282 |
| | −0.000432988 | 0.006673496 | −2.17E−03 | −1.47E−04 |
| S13 | 4125.063 | 0.02456465 | 0.023273928 | −0.028320209 |
| | 0.006128956 | 0.009453012 | −3.86E−03 | −2.17E−04 |
| S14 | −14.9028 | 0.058170471 | 0.10004734 | 0.000307198 |
| | −0.021863276 | 0.04726975 | −2.38E−02 | 6.65E−04 |
| S16 | −7265.04 | −0.10306565 | 0.003871945 | 0.025943356 |
| | −0.023903474 | 0.006864957 | 1.71E−03 | −2.69E03 |
| S17 | −217.534 | −0.067730931 | −0.020575026 | 0.021656606 |
| | −0.002067265 | −0.001974986 | 7.07E−04 | −5.54E−05 |
| S18 | 1046.437 | −0.01043783 | −0.015395534 | 0.003496637 |
| | 0.000720169 | −0.000453211 | 4.89E−05 | 5.44E−06 |
| S19 | −0.23313 | 0.016003498 | −0.006712571 | 0.002465054 |
| | −0.000428693 | −8.63E−05 | 2.71E−05 | −1.38E−06 |
| S110 | −10.535 | −0.11112052 | 0.05001558 | −0.011027879 |
| | 0.001436059 | −0.000102669 | 3.13E−06 | −5.44E−09 |
| S111 | −49.8499 | −0.046132544 | 0.013207205 | −0.00262408 |
| | 0.00027185 | −1.12E−05 | −1.97E−08 | 8.06E−09 |

For the lens assembly 1 of the first embodiment, the effective diameter $D1_{L11}$ of the first lens L11 is equal to 2.68 mm, the effective diameter $D1_{L12}$ of the second lens L12 is equal to 2.030 mm, the effective diameter of the stop ST1 is equal to 1.998 mm, the Abbe number $Vd1_1$ of the first lens L11 is equal to 56.1, the Abbe number $Vd1_2$ of the second lens L12 is equal to 21.5, the Abbe number $Vd1_3$ of the third lens L13 is equal to 21.5, the Abbe number $Vd1_4$ of the fourth lens L14 is equal to 40.3, the Abbe number $Vd1_5$ of the fifth lens L15 is equal to 56.1, the effective focal length f1 of the lens assembly 1 is equal to 4.914 mm, the effective focal length $f1_1$ of the first lens L11 is equal to 3.0183 mm, the effective focal length $f1_3$ of the third lens L13 is equal to −13.9211, the effective focal length $f1_4$ of the fourth lens L14 is equal to 3.9326 mm, the interval SL1 from the stop ST1 to image plane IMA1 along the optical axis OA1 is equal to 3.778 mm, the interval TTL1 from the object side surface S11 of the first lens L11 to the image plane IMA1 along the optical axis OA1 is equal to 5.515 mm. According to the above data, the following values can be obtained:

$D1_{L11}/D1_{ST1} = 1.34$, $D1_{L11}/D1_{L12} = 1.32$, $Vd1_1 = 56.1$, $Vd1_2 = 21.5$, $Vd1_3 = 21.5$, $Vd1_4 = 40.3$, $Vd1_5 = 56.1$, $f1/f1_3 + f1/f1_4 − f1/f1_1 = −0.7314$, $Vd1_4 − Vd1_3 = 18.8$, $SL1/TTL1 = 0.685$, $F1 = 1.6$ which respectively satisfy the above conditions (1)-(11).

Figure 2A:
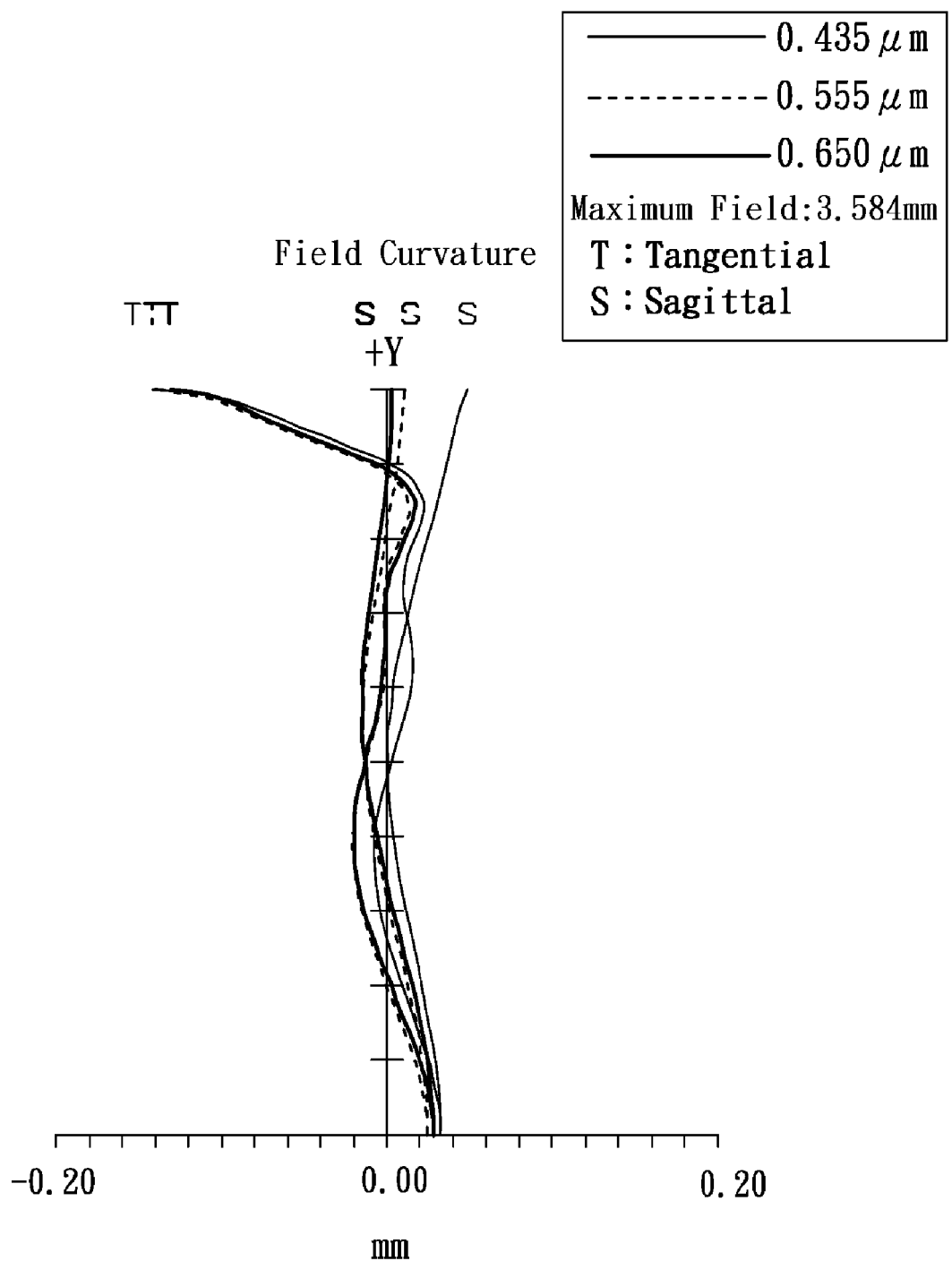
FIG. 2A depicts a field curvature diagram of the lens assembly in accordance with the first embodiment of the invention.
Figure 2B:
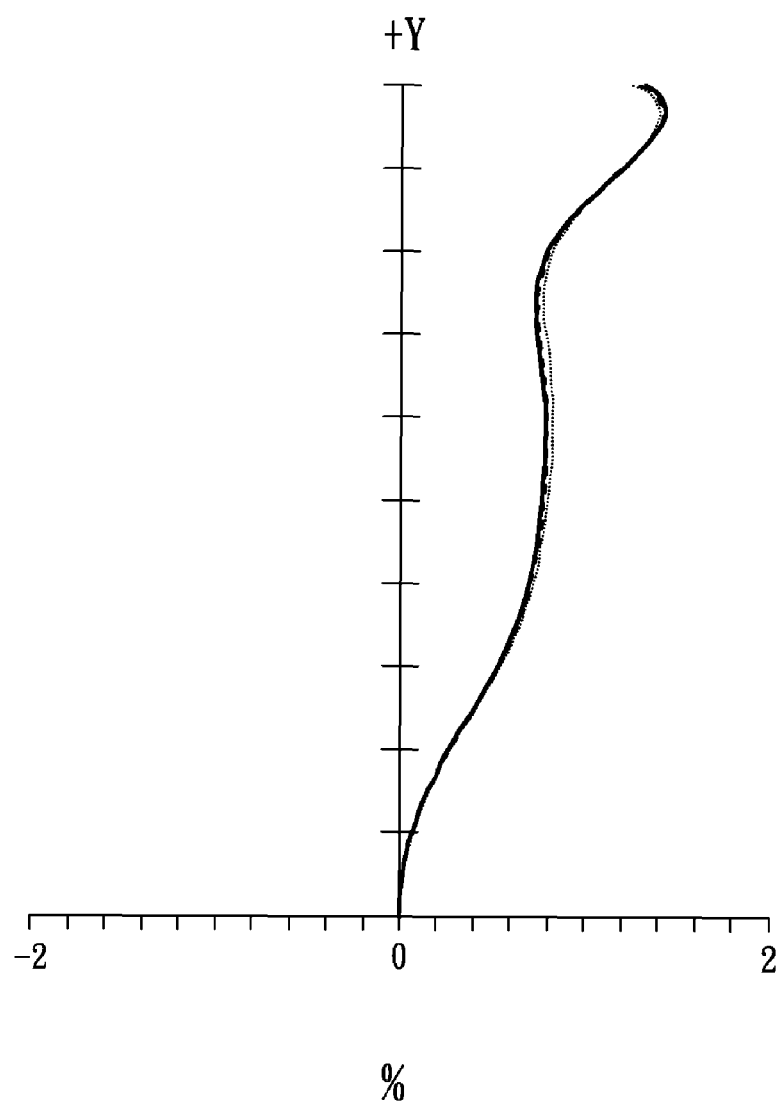
FIG. 2B is a distortion diagram of the lens assembly in accordance with the first embodiment of the invention.
Figure 2C:
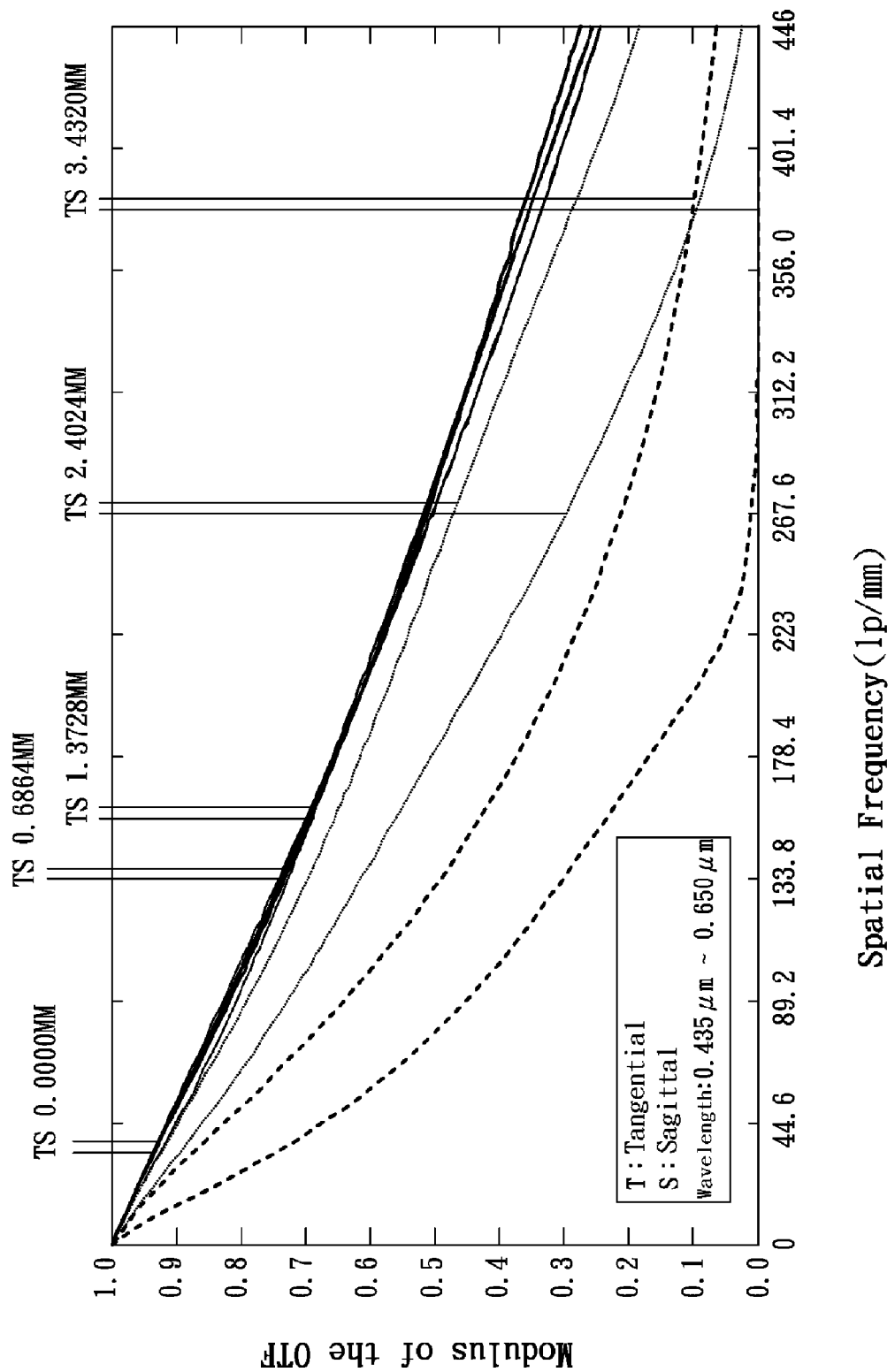
FIG. 2C is a modulation transfer function diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.16 mm to 0.06 mm for the wavelength of 0.435 μm, 0.555 μm and 0.650 μm. It can be seen from FIG. 2B that the distortion in the lens assembly 1 of the first embodiment ranges from 0.0% to 1.4% for the wavelength of 0.435 μm, 0.555 μm, and 0.650 μm. It can be seen from FIG. 2C that the modulation transfer function of tangential direction and sagittal direction in the lens assembly 1 of the first embodiment ranges from 0.0 to 1.0 when the wavelength ranges from 0.435 μm to 0.650 μm, the fields respectively are 0.0000 mm, 0.6864 mm, 1.3728 mm, 2.4024 mm and 3.4320 mm, and the spatial frequency ranges from 0 lp/mm to 446 lp/mm. It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

In the above embodiment, when the effective diameter of the stop ST1 can be respectively adjusted to 2.348 mm, 1.458 mm, 0.954 mm and 0.246 mm, F-number of the lens assembly 1 can be respectively changed to 1.4, 2.4, 3.4 and 13, the maximum value of $D1_{L11}/D1_{ST1}$ is equal to 10.894 (2.68/0.246) and the minimum value of $D1_{L11}/D1_{ST1}$ is equal to 1.141(2.68/2.348), which satisfy the above condition (1). By changing the effective diameter of the stop ST1, which can control the amount of the incident light of the lens assembly 1 and change illuminance of image plane IMA1. On the other hand, changing the effective diameter of the stop ST1 can control depth of Field, when the greater effective diameter of the stop ST1, the shorter depth of Field. When the smaller effective diameter of the stop ST1, the longer depth of Field.

Figure 3:
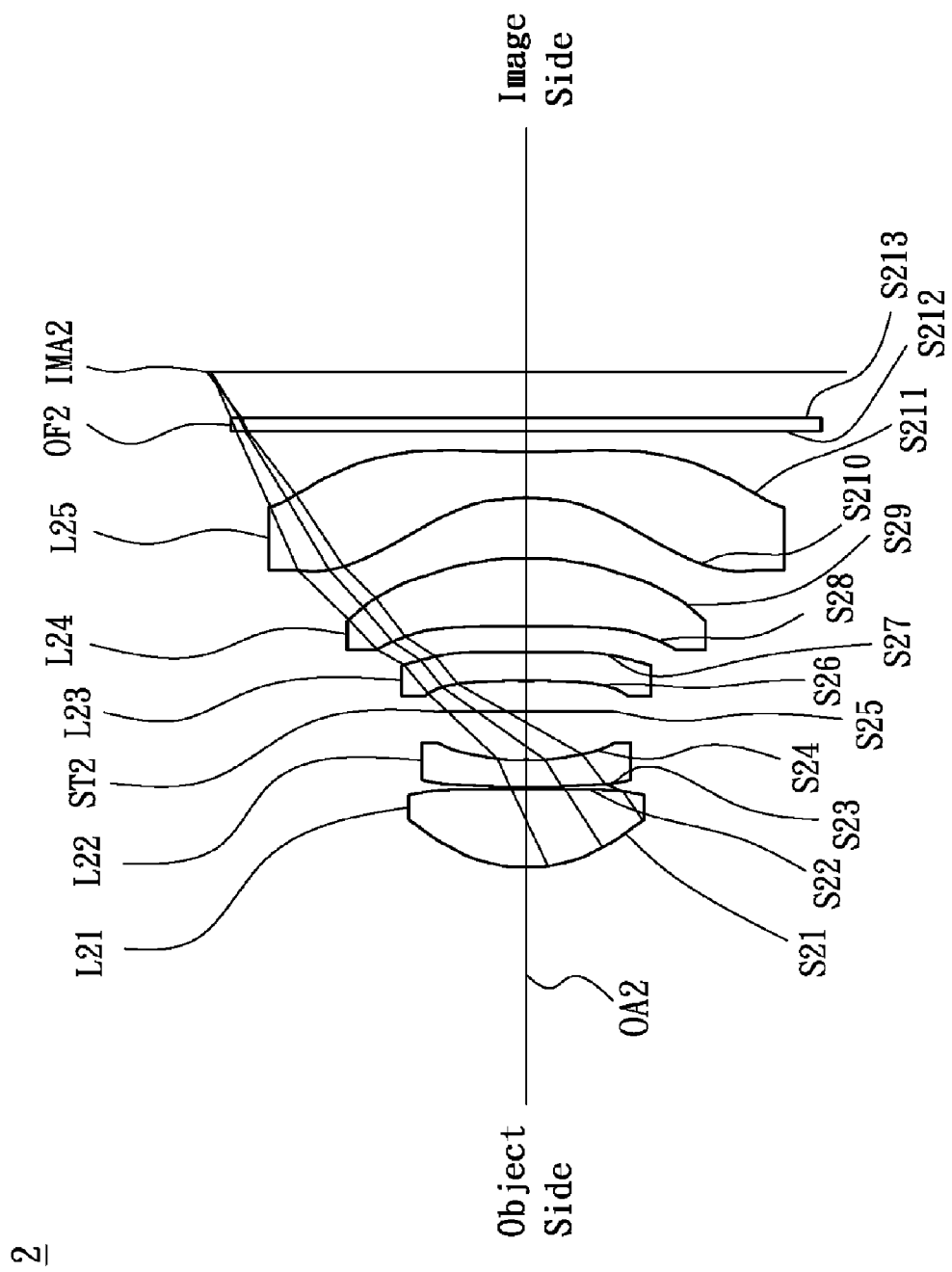
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a second lens L22, a stop ST2, a third lens L23, a fourth lens L24, a fifth lens L25 and an optical filter OF2, all of which are arranged in sequence from an object side to an image side along an optical axis OA2. In operation, an image of light rays from the object side is formed at an image plane IMA2. The first lens L21 is with positive refractive power and made of plastic material, wherein the object side surface S21 is a convex surface, the image side surface S22 is a convex surface and both of the object side surface S21 and image side surface S22 are aspheric surfaces. The second lens L22 is with negative refractive power and made of plastic material, wherein the object side surface S23 is a convex surface, the image side surface S24 is a concave surface and both of the object side surface S23 and image side surface S24 are aspheric surfaces. The third lens L23 is with negative refractive power and made of plastic material, wherein the object side surface S26 is a convex surface, the image side surface S27 is a concave surface and both of the object side surface S26 and image side surface S27 are aspheric surfaces. The fourth lens L24 is with positive refractive power and made of glass material, wherein the object side surface S28 is a concave surface, the image side surface S29 is a convex surface and both of the object side surface S28 and image side surface S29 are aspheric surfaces. The fifth lens L25 is with negative refractive power and made of plastic material, wherein the object side surface S210 is a concave surface, the image side surface S211 is a concave surface and both of the object side surface S210 and image side surface S211 are aspheric surfaces. Both of the object side surface S212 and image side surface S213 of the optical filter OF2 are plane surfaces. In the second embodiment, Abbe number of the first lens L21, the fourth lens L24 and the fifth lens L25 are greater than Abbe number of the second lens L22 and the third lens L23.

In order to maintain excellent optical performance of the lens assembly in accordance with the second embodiment of the invention, the lens assembly 2 must satisfy the following eleven conditions:

$$1.10 < D2_{L21}/D2_{ST2} < 10.90 \quad (12)$$

$$1.10 < D2_{L21}/D2_{L22} < 1.35 \quad (13)$$

$$Vd2_1 > 40 \quad (14)$$

$$Vd2_2 < 40 \quad (15)$$

$$Vd2_3 < 40 \quad (16)$$

$$Vd2_4 > 40 \quad (17)$$

$$Vd2_5 > 40 \quad (18)$$

$$-1.3 < f2/f2_3 + f2/f2_4 - f2/f2_1 < -0.1 \quad (19)$$

$$15 \le Vd2_4 - Vd2_3 < 43.61 \quad (20)$$

$$0.6 < SL2/TTL2 < 0.87 \quad (21)$$

$$1.4 \le F2 \le 13 \quad (22)$$

wherein $D2_{L21}$ is an effective diameter of the first lens L21, $D2_{L22}$ is an effective diameter of the second lens L22, $D2_{ST2}$ is an effective diameter of the stop ST2. A straight length of the effective diameter $D2_{L21}$ of the first lens L21 means from an edge of the first lens L21 through a center point of the first lens L21 to the other edge. A straight length of the effective diameter $D2_{L22}$ of the second lens L22 means from an edge of the second lens L22 through a center point of the second lens L22 to the other edge. The effective diameter $D2_{ST2}$ of the stop ST2 means a diameter of optical opening of the stop ST2. $Vd2_1$ is an Abbe number of first lens L21, $Vd2_2$ is an Abbe number of second lens L22, $Vd2_3$ is an Abbe number of third lens L23, $Vd2_4$ is an Abbe number of fourth lens L24, $Vd2_5$ is an Abbe number of fifth lens L25, f2 is an effective focal length of the lens assembly 2, $f2_1$ is an effective focal length of the first lens L21, $f2_3$ is an effective focal length of the third lens L23, $f2_4$ is an effective focal length of the fourth lens L24, SL2 is an interval from the stop ST2 to the image plane IMA2 along the optical axis OA2, TTL2 is an interval from an object side surface S21 of the first lens to the image plane IMA2 along the optical axis OA2.

By the above design of the lenses and stop ST2, the lens assembly 2 is provided with a shortened total lens length, an effective corrected aberration and an increased resolution.

In order to achieve the above purposes and effectively enhance the optical performance, the lens assembly 2 in accordance with the second embodiment of the invention is provided with the optical specifications shown in Table 3, which include the effective focal length, F-number, total lens length, radius of curvature of each lens surface in mm, thickness between adjacent surface in mm, refractive index of each lens and Abbe number of each lens. Table 3 shows that the effective focal length is equal to 4.837 mm, F-number is equal to 1.6, total lens length is equal to 5.493 mm, field of view is equal to 120°, effective diameter of the first lens L21 is equal to 2.74 mm, effective diameter of the second lens L22 is equal to 2.314 mm and effective diameter of the stop ST2 is equal to 2.052 mm for the lens assembly 2 of the second embodiment of the invention.

TABLE 3

| Effective Focal Length = 4.837 mm | F-number = 1.6 |
|---|---|
| Total Lens Length = 5.493 mm | field of view = 120° |
| effective diameter of the first lens L21 = 2.74 mm | |

TABLE 3-continued effective diameter of the second lens L22 = 2.314 mm
effective diameter of the stop ST2 = 2.052 mm

| Surface Number | Radius of Curvature (mm) | Thickness (mm) | Nd | Vd | Remark |
|---|---|---|---|---|---|
| S21 | 1.770213 | 0.875511 | 1.53 | 56.1 | The First Lens L21 |
| S22 | −15.6246 | 0.016305 | | | |
| S23 | 77.46229 | 0.302447 | 1.65 | 21.5 | The Second Lens L22 |
| S24 | 3.653142 | 0.39944 | | | |
| S25 | ∞ | 0.469051 | | | Stop ST2 |
| S26 | 68.47689 | 0.310352 | 1.65 | 35 | The Third Lens L23 |
| S27 | 8.225647 | 0.310045 | | | |
| S28 | −59.9334 | 0.748543 | 1.85 | 50 | The Fourth Lens L24 |
| S29 | −3.18744 | 0.672541 | | | |
| S210 | −2.56721 | 0.499967 | 1.53 | 56.1 | The Fifth Lens L25 |
| S211 | 6.809095 | 0.24 | | | |
| S212 | ∞ | 0.145 | | | Optical Filter OF2 |
| S213 | ∞ | 0.504791 | | | |

The aspheric surface sag z of each lens in table 3 can be calculated by the following formula:

$$z = ch^2 / \{1 + [1 - (k+1)c^2 h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | k | A | B | C |
| | D | E | F | G |
|---|---|---|---|---|
| S21 | −0.53631 | 0.009886469 | 0.000977292 | −0.006377328 |
| | 0.007205064 | −0.003904845 | 1.57E−05 | 3.78E−06 |
| S22 | 107.7376 | 0.02458309 | 0.004359863 | −0.01793564 |
| | −0.000517998 | 0.006683355 | −2.20E−03 | −1.33E−04 |
| S23 | 4349.852 | 0.024255909 | 0.023224891 | −0.028221819 |
| | 0.00603599 | 0.009384775 | −3.91E−03 | −2.80E−04 |
| S24 | −14.6512 | 0.058017374 | 0.009487751 | 0.000117773 |
| | −0.02067217 | 0.046531098 | −2.39E−02 | 1.12E−04 |
| S26 | −5619.73 | −0.095569255 | −0.003050543 | 0.024097369 |
| | −0.017237898 | 0.008476985 | −3.84E−03 | −9.15E−04 |
| S27 | −137.244 | −0.066642389 | −0.021435231 | 0.023104931 |
| | −0.001598446 | −0.002293318 | 5.25E−04 | −1.43E−05 |
| S28 | 982.5376 | −0.01043783 | −0.015395534 | 0.003496637 |
| | 0.000720169 | −0.000453211 | 4.89E−05 | 5.44E−06 |
| S29 | 0.143144 | −0.012751779 | −0.016881917 | 0.004023966 |
| | 0.000693383 | −4.49E−04 | 6.42E−05 | 1.46E−06 |
| S210 | −7.95772 | 0.011901475 | 0.049934571 | −0.011071364 |
| | 0.001432537 | −0.000102839 | 3.14E−06 | −1.73E−09 |
| S211 | −92.1371 | −0.045853456 | 0.013576947 | −0.003674994 |
| | 0.000266902 | −1.07E−05 | 3.66E−08 | 1.05E−09 |

For the lens assembly 2 of the second embodiment, the effective diameter $D2_{L21}$ of the first lens L21 is equal to 2.74 mm, the effective diameter $D2_{L22}$ of the second lens L22 is equal to 2.314 mm, the effective diameter of the stop ST2 is equal to 2.052 mm, the Abbe number $Vd2_1$ of the first lens L21 is equal to 56.1, the Abbe number $Vd2_2$ of the second lens L22 is equal to 21.5, the Abbe number $Vd2_3$ of the third lens L23 is equal to 35, the Abbe number $Vd2_4$ of the fourth lens L24 is equal to 50, the Abbe number $Vd2_5$ the fifth lens L25 is equal to 56.1, the effective focal length f2 of the lens assembly 2 is equal to 4.837 mm, the effective focal length $f2_1$ of the first lens L21 is equal to 3.0152 mm, the effective focal length $f2_3$ of the third lens L23 is equal to −14.3156, the effective focal length $f2_4$ of the fourth lens L24 is equal to 3.9271 mm, the interval SL2 from the stop ST2 to image plane IMA2 along the optical axis OA2 is equal to 3.897 mm, the interval TTL2 from the object side surface S21 of the first lens L21 to the image plane IMA2 along the optical axis OA2 is equal to 5.493 mm. According to the above data, the following values can be obtained:

$D2_{L21}/D2_{ST2} = 1.34$, $D2_{L21}/D2_{L22} = 1.18$, $Vd2_1 = 56.1$, $Vd2_2 = 21.5$, $Vd2_3 = 35$, $Vd2_4 = 50$, $Vd2_5 = 56.1$, $f2/f2_3 + f2/f2_4 - f2/f2_1 = -0.71$, $Vd2_4 - Vd2_3 = 15$,

SL2/TTL2=0.709,

F2=1.6 which respectively satisfy the above conditions (12)-(22).

Figure 4A:
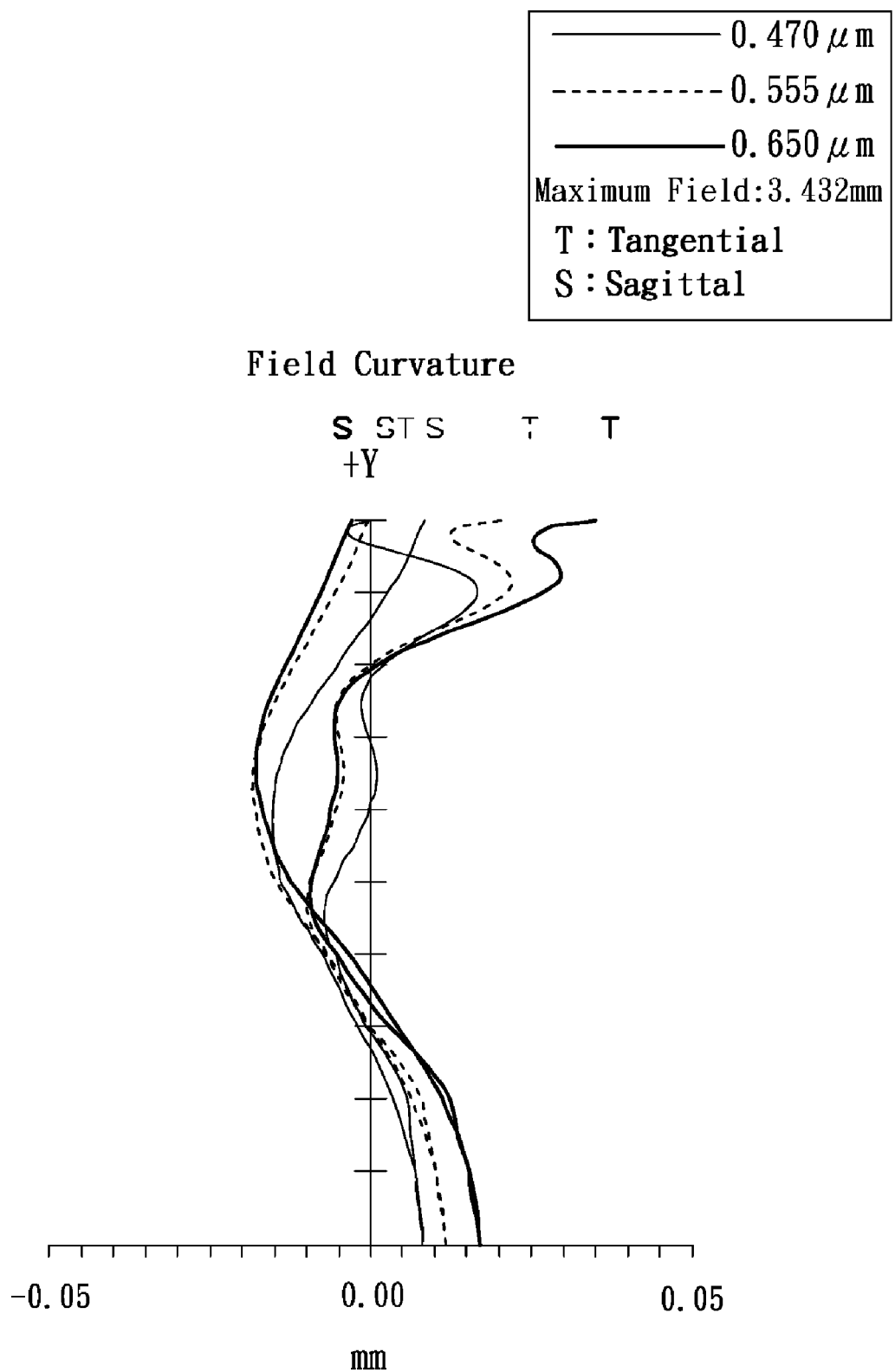
FIG. 4A depicts a field curvature diagram of the lens assembly in accordance with the second embodiment of the invention.
Figure 4B:
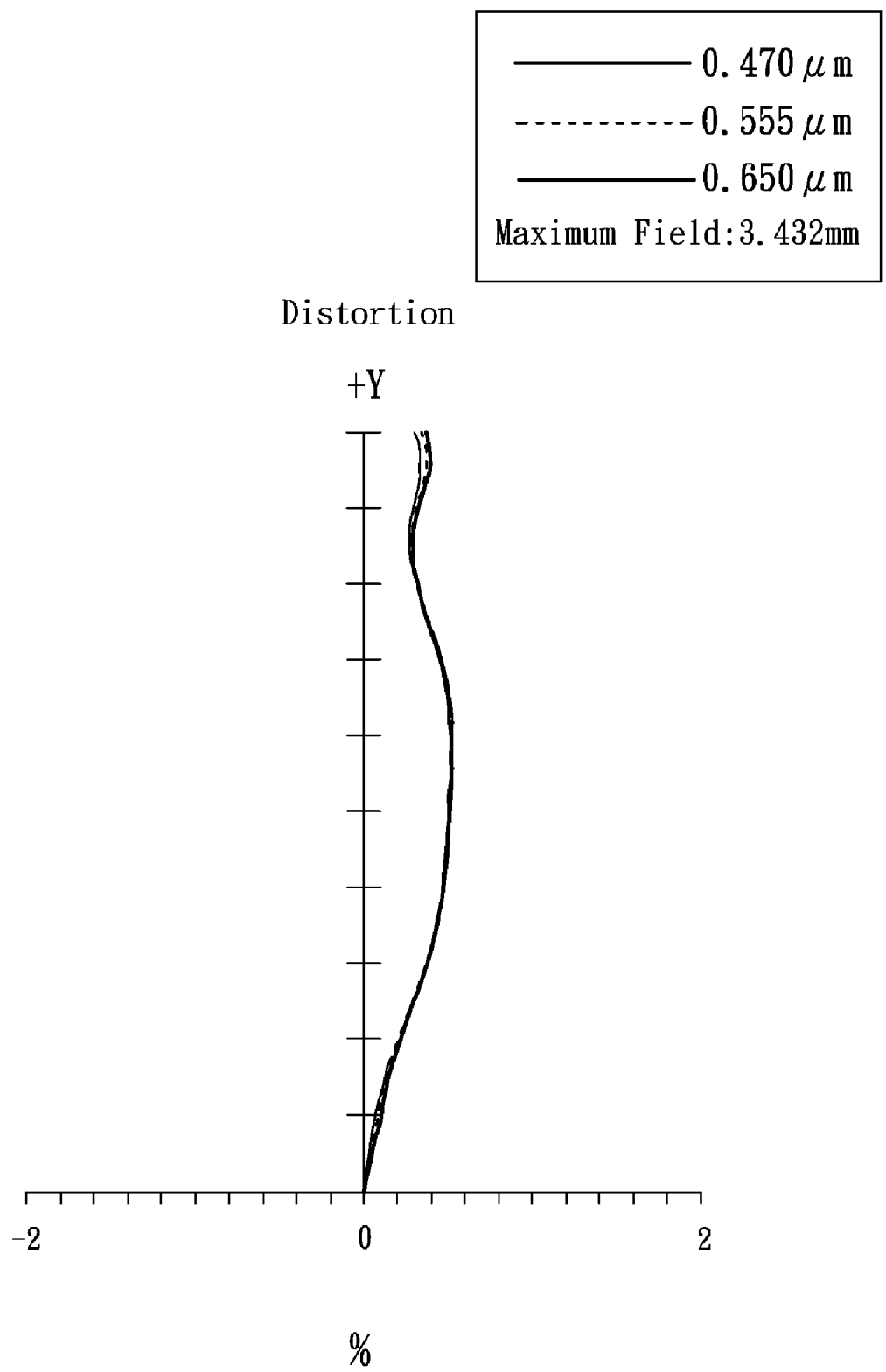
FIG. 4B is a distortion diagram of the lens assembly in accordance with the second embodiment of the invention.
Figure 4C:
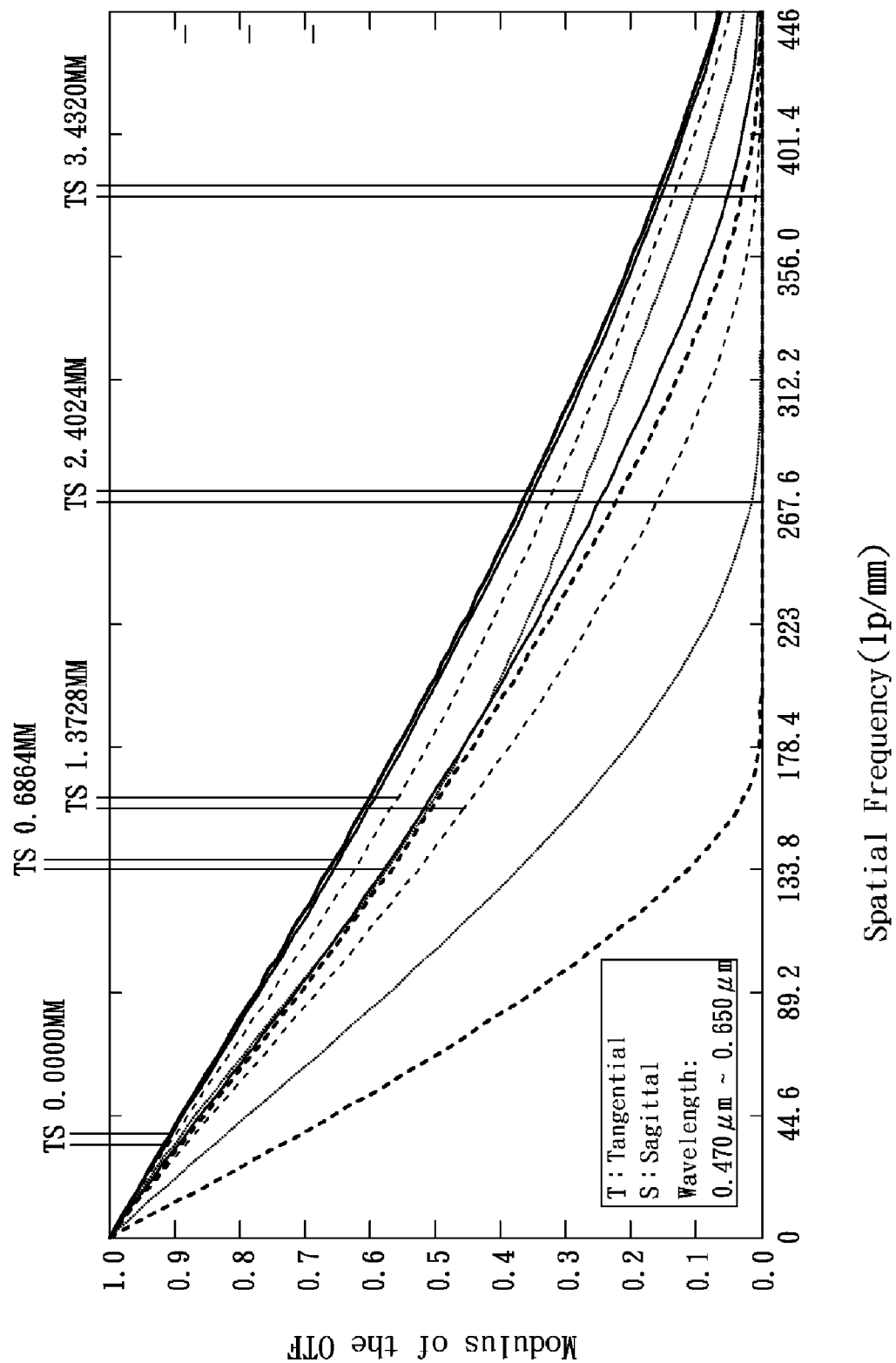
FIG. 4C is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a field curvature diagram of the lens assembly 2 in accordance with the second embodiment of the invention, FIG. 4B shows a distortion diagram of the lens assembly 2 in accordance with the second embodiment of the invention, FIG. 4C shows a modulation transfer function diagram of the lens assembly 2 in accordance with the second embodiment of the invention.

It can be seen from FIG. 4A that the field curvature of tangential direction and sagittal direction in the lens assembly 2 of the second embodiment ranges from −0.020 mm to 0.035 mm for the wavelength of 0.470 μm, 0.555 μm and 0.650 μm. It can be seen from FIG. 4B that the distortion in the lens assembly 2 of the second embodiment ranges from 0.0% to 0.6% for the wavelength of 0.470 μm, 0.555 μm, and 0.650 μm. It can be seen from FIG. 4C that the modulation transfer function of tangential direction and sagittal direction in the lens assembly 2 of the second embodiment ranges from 0.0 to 1.0 when the wavelength ranges from 0.470 μm to 0.650 μm, the fields respectively are 0.0000 mm, 0.6864 mm, 1.3728 mm, 2.4024 mm and 3.4320 mm, and the spatial frequency ranges from 0 lp/mm to 446 lp/mm. It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance.

In another embodiment described above, when the effective diameter of the stop ST2 can be respectively adjusted to 2.222 mm, 1.41 mm, 0.98 mm and 0.252 mm, F-number of the lens assembly 2 can be respectively changed to 1.4, 2.4, 3.4 and 13, the maximum value of $D2_{L21}/D2_{ST2}$ is equal to 10.873(2.74/0.252) and the minimum value of $D2_{L21}/D2_{ST2}$ is equal to 1.233(2.74/2.222), which satisfy the above condition (12). By changing the effective diameter of the stop ST2, which can control the amount of the incident light of the lens assembly 2 and change illuminance of image plane IMA2. On the other hand, changing the effective diameter of the stop ST2 can control depth of Field, when the greater effective diameter of the stop ST2, the shorter depth of Field. When the smaller effective diameter of the stop ST2, the longer depth of Field.

Figure 5:
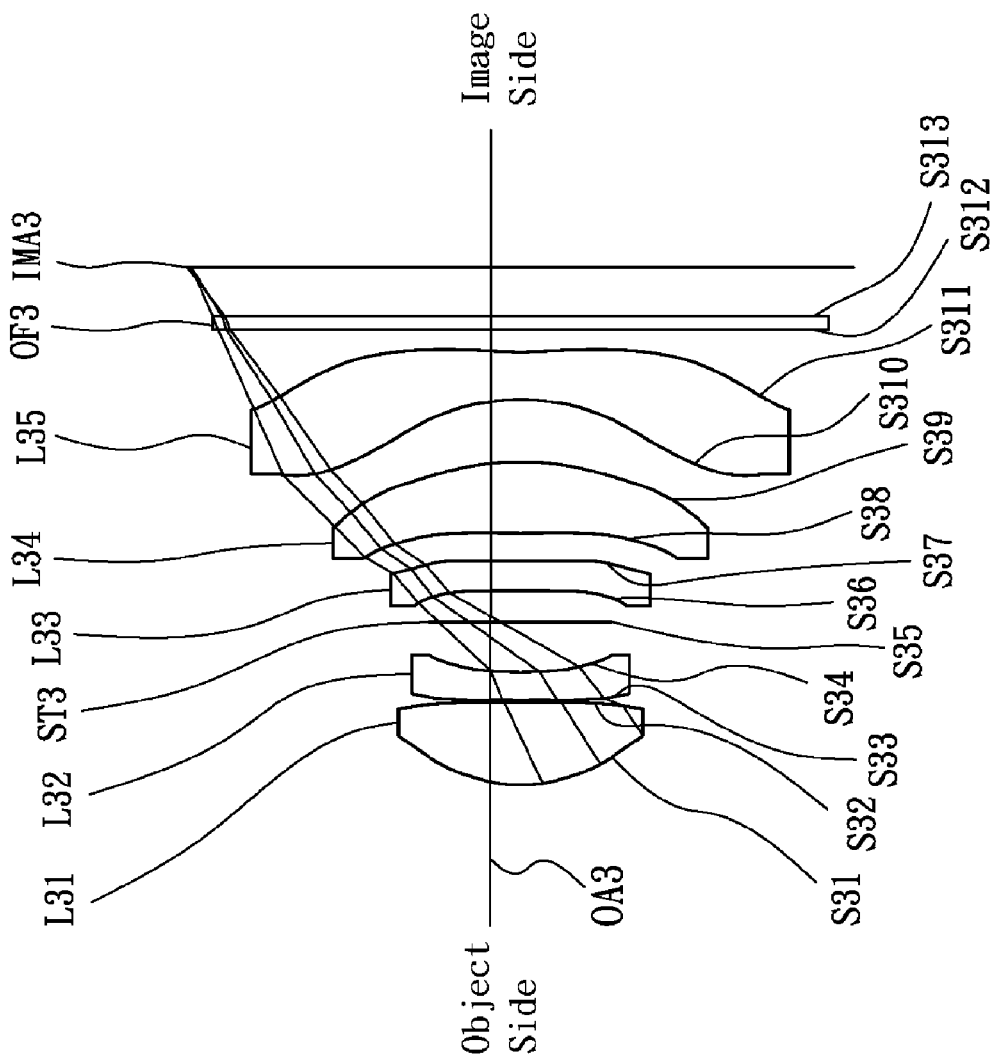
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a first lens L31, a second lens L32, a stop ST3, a third lens L33, a fourth lens L34, a fifth lens L35 and an optical filter OF3, all of which are arranged in sequence from an object side to an image side along an optical axis OA3. In operation, an image of light rays from the object side is formed at an image plane IMA3. The first lens L31 is with positive refractive power and made of plastic material, wherein the object side surface S31 is a convex surface, the image side surface S32 is a convex surface and both of the object side surface S31 and image side surface S32 are aspheric surfaces. The second lens L32 is with negative refractive power and made of plastic material, wherein the object side surface S33 is a convex surface, the image side surface S34 is a concave surface and both of the object side surface S33 and image side surface S34 are aspheric surfaces. The third lens L33 is with negative refractive power and made of plastic material, wherein the object side surface S36 is a convex surface, the image side surface S37 is a concave surface and both of the object side surface S36 and image side surface S37 are aspheric surfaces. The fourth lens L34 is with positive refractive power and made of glass material, wherein the object side surface S38 is a concave surface, the image side surface S39 is a convex surface and both of the object side surface S38 and image side surface S39 are aspheric surfaces. The fifth lens L35 is with negative refractive power and made of plastic material, wherein the object side surface S310 is a concave surface, the image side surface S311 is a concave surface and both of the object side surface S310 and image side surface S311 are aspheric surfaces. Both of the object side surface S312 and image side surface S313 of the optical filter OF3 are plane surfaces. In the third embodiment, Abbe number of the first lens L31, the fourth lens L34 and the fifth lens L35 are greater than Abbe number of the second lens L32 and the third lens L33.

In order to maintain excellent optical performance of the lens assembly in accordance with the third embodiment of the invention, the lens assembly 3 must satisfy the following eleven conditions:

$$1.10 < D3_{L31}/D3_{ST2} < 10.90 \tag{23}$$

$$1.10 < D3_{L31}/D3_{L32} < 1.35 \tag{24}$$

$$Vd3_1 > 40 \tag{25}$$

$$Vd3_2 < 40 \tag{26}$$

$$Vd3_3 < 40 \tag{27}$$

$$Vd3_4 > 40 \tag{28}$$

$$Vd3_5 > 40 \tag{29}$$

$$-1.3 < f3/f3_3 + f3/f3_4 - f3/f3_1 < -0.1 \tag{30}$$

$$15 \leq Vd3_4 - Vd3_3 < 43.61 \tag{31}$$

$$0.6 < SL3/TTL3 < 0.87 \tag{32}$$

$$1.4 \leq F3 \leq 13 \tag{33}$$

wherein $D3_{L31}$ is an effective diameter of the first lens L31, $D3_{L32}$ is an effective diameter of the second lens L32, $D3_{ST3}$ is an effective diameter of the stop ST3. A straight length of the effective diameter $D3_{L31}$ of the first lens L31 means from an edge of the first lens L31 through a center point of the first lens L31 to the other edge. A straight length of the effective diameter $D3_{L32}$ of the second lens L32 means from an edge of the second lens L32 through a center point of the second lens L32 to the other edge. The effective diameter $D2_{ST3}$ of the stop ST3 means a diameter of optical opening of the stop ST3. $Vd3_1$ is an Abbe number of first lens L31, $Vd3_2$ is an Abbe number of second lens L32, $Vd3_3$ is an Abbe number of third lens L33, $Vd3_4$ is an Abbe number of fourth lens L34, $Vd3_5$ is an Abbe number of fifth lens L35, f3 is an effective focal length of the lens assembly 3, $f3_1$ an effective focal length of the first lens L31, $f3_3$ is an effective focal length of the third lens L33, $f3_4$ is an effective focal length of the fourth lens L34, SL3 is an interval from the stop ST3 to the image plane IMA3 along the optical axis OA3, TTL3 is an interval from an object side surface S31 of the first lens to the image plane IMA3 along the optical axis OA3.

By the above design of the lenses and stop ST3, the lens assembly 3 is provided with a shortened total lens length, an effective corrected aberration and an increased resolution.

In order to achieve the above purposes and effectively enhance the optical performance, the lens assembly 3 in accordance with the third embodiment of the invention is provided with the optical specifications shown in Table 5, which include the effective focal length, F-number, total lens length, radius of curvature of each lens surface in mm, thickness between adjacent surface in mm, refractive index of each lens and Abbe number of each lens. Table 5 shows that the effective focal length is equal to 4.885 mm, F-number is equal to 1.6, total lens length is equal to 5.494 mm, field of view is equal to 120°, effective diameter of the first lens L31 is equal to 2.59 mm, effective diameter of the second lens L32 is equal to 2.268 mm and effective diameter of the stop ST3 is equal to 2.084 mm for the lens assembly 3 of the third embodiment of the invention.

For the lens assembly 3 of the third embodiment, the effective diameter $D3_{L31}$ of the first lens L31 is equal to 2.59 mm, the effective diameter $D3_{L32}$ of the second lens L32 is equal to 2.268 mm, the effective diameter of the stop ST3 is equal to 2.084 mm, the Abbe number $Vd3_1$ of the first lens L31 is equal to 56.1, the Abbe number $Vd3_2$ of the second lens L32 is equal to 21.5, the Abbe number $Vd3_3$ of the third lens L33 is equal to 21.5, the Abbe number $Vd3_4$ of the

TABLE 5

Effective Focal Length = 4.885 mm  
Total Lens Length = 5.494 mm  
effective diameter of the first lens L31 = 2.59 mm  
effective diameter of the second lens L32 = 2.268 mm  
effective diameter of the stop ST3 = 2.084 mm  
F-number = 1.6  
field of view = 120°

| Surface Number | Radius of Curvature (mm) | Thickness (mm) | Nd | Vd | Remark |
|---|---|---|---|---|---|
| S31 | 1.771681 | 0.871357 | 1.53 | 56.1 | The First Lens L31 |
| S32 | −15.6329 | 0.016305 | | | |
| S33 | 76.71141 | 0.301682 | 1.65 | 21.5 | The Second Lens L32 |
| S34 | 3.653628 | 0.390248 | | | |
| S35 | ∞ | 0.475287 | | | Stop ST3 |
| S36 | 54.90513 | 0.317373 | 1.65 | 21.5 | The Third Lens L33 |
| S37 | 8.028085 | 0.326353 | | | |
| S38 | −60.1783 | 0.732153 | 1.85 | 60 | The Fourth Lens L34 |
| S39 | −3.17972 | 0.676934 | | | |
| S310 | −2.58237 | 0.499967 | 1.53 | 56.1 | The Fifth Lens L35 |
| S311 | 5.601191 | 0.24 | | | |
| S312 | ∞ | 0.145 | | | Optical Filter OF3 |
| S313 | ∞ | 0.501848 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 6.

fourth lens L34 is equal to 60, the Abbe number $Vd3_5$ of the fifth lens L35 is equal to 56.1, the effective focal length f3 of the lens assembly 3 is equal to 4.885 mm, the effective focal length $f3_1$ of the first lens L31 is equal to 3.017 mm, the effective focal length $f3_3$ of the third lens L33 is equal to −14.362, the effective focal length $f3_4$ of the fourth lens L34 is equal to 3.913 mm, the interval SL3 from the stop ST3 to image plane IMA3 along the optical axis OA3 is equal to 3.911 mm, the interval TTL3 from the object side surface S31 of the first lens L31 to the image plane IMA3 along the

TABLE 6

| Surface Number | k | A | B | C |
| | D | E | F | G |
|---|---|---|---|---|
| S31 | −0.54305 | 0.009688492 | 0.001055272 | −0.006371799 |
| | 0.007246844 | −0.003896498 | 9.48E−06 | −1.65E−05 |
| S32 | 106.7435 | 0.024704209 | 0.004421365 | −0.017974575 |
| | −0.000557139 | 0.006669641 | −2.20E−03 | −1.20E−04 |
| S33 | 4404.847 | 0.024268271 | 0.02319228 | −0.028077951 |
| | 0.006114599 | 0.009445244 | −3.91E−03 | −3.39E−04 |
| S34 | −14.9208 | 0.057718415 | 0.009933214 | 0.000310022 |
| | −0.02034366 | 0.046576848 | −2.39E−02 | 4.57E−04 |
| S36 | −8515.43 | −0.094921996 | −0.002853276 | 0.023489048 |
| | −0.01757771 | 0.008593427 | −3.70E−03 | −1.15E−03 |
| S37 | −150.284 | −0.067431765 | −0.021110609 | 0.023090302 |
| | −0.001762208 | −0.002359591 | 5.24E−04 | 2.18E−08 |
| S38 | 1012.33 | −0.011840386 | −0.016768142 | 0.004149594 |
| | 0.000725294 | −0.000447794 | 6.23E−05 | 4.39E−07 |
| S39 | 0.121642 | 0.011829762 | −0.006379843 | 0.002670135 |
| | −0.000376206 | −9.04E−05 | 2.14E−05 | −2.56E−05 |
| S310 | −6.59419 | −0.10856299 | 0.049904696 | −0.011065644 |
| | 0.00143304 | −0.000102805 | 3.14E−06 | −1.76E−09 |
| S311 | −95.3522 | −0.046252171 | 0.013398786 | −0.002672975 |
| | 0.000267844 | −1.06E−05 | 3.02E−08 | −6.14E−10 | optical axis OA3 is equal to 5.494 mm. According to the above data, the following values can be obtained:

$D3_{L31}/D3_{ST3}=1.24$, $D3_{L31}/D3_{L32}=1.14$, $Vd3_1=56.1$, $Vd3_2=21.5$, $Vd3_3=21.5$, $Vd3_4=60$, $Vd3_5=56.1$, $f3/f3_3+f3/f3_4-f3/f3_1=-0.7111$, $Vd3_4-Vd3_3=38.5$, $SL3/TTL3=0.711$, $F3=1.6$ which respectively satisfy the above conditions (23)-(33).

Figure 6A:
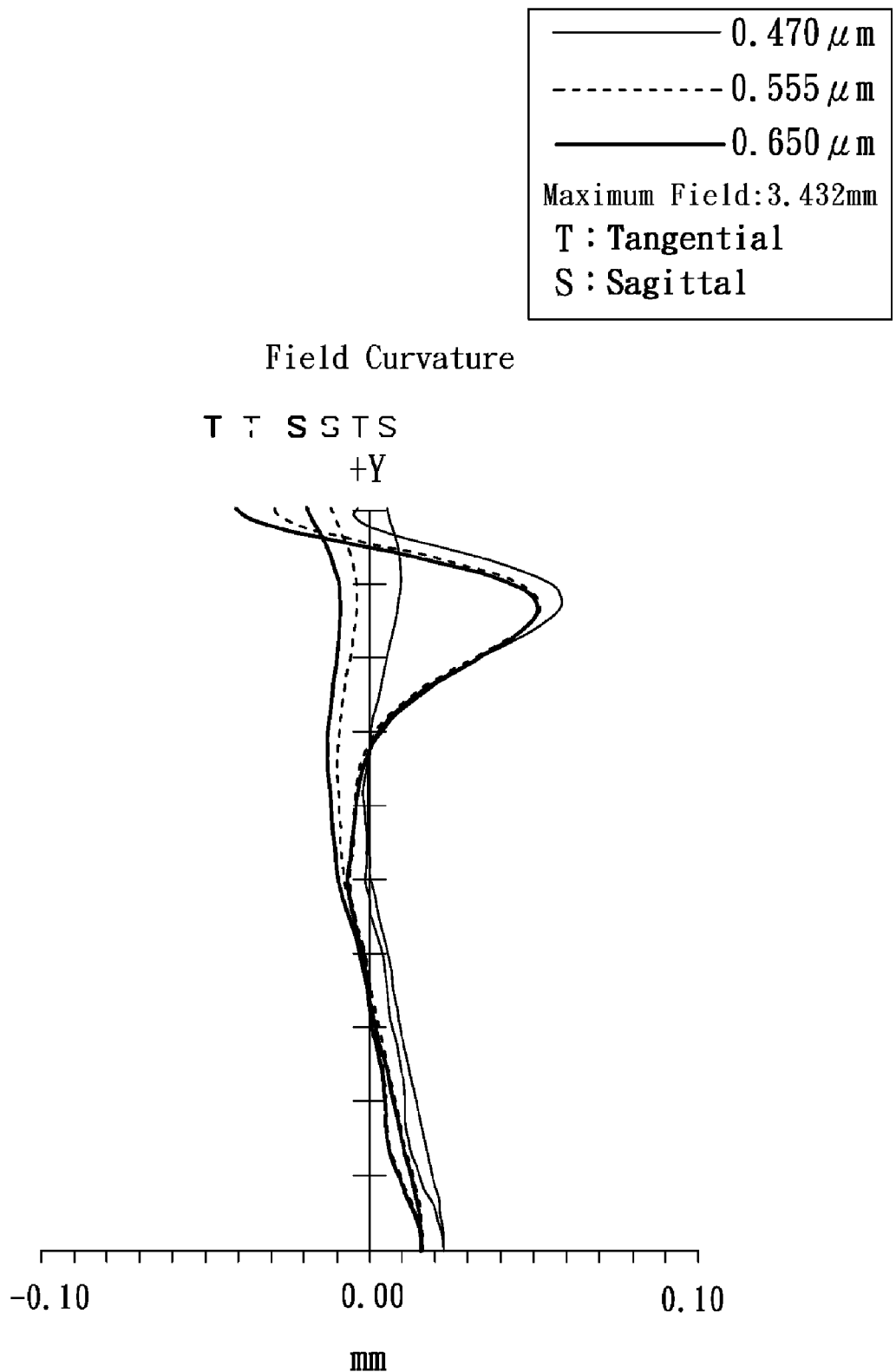
FIG. 6A depicts a field curvature diagram of the lens assembly in accordance with the third embodiment of the invention.
Figure 6B:
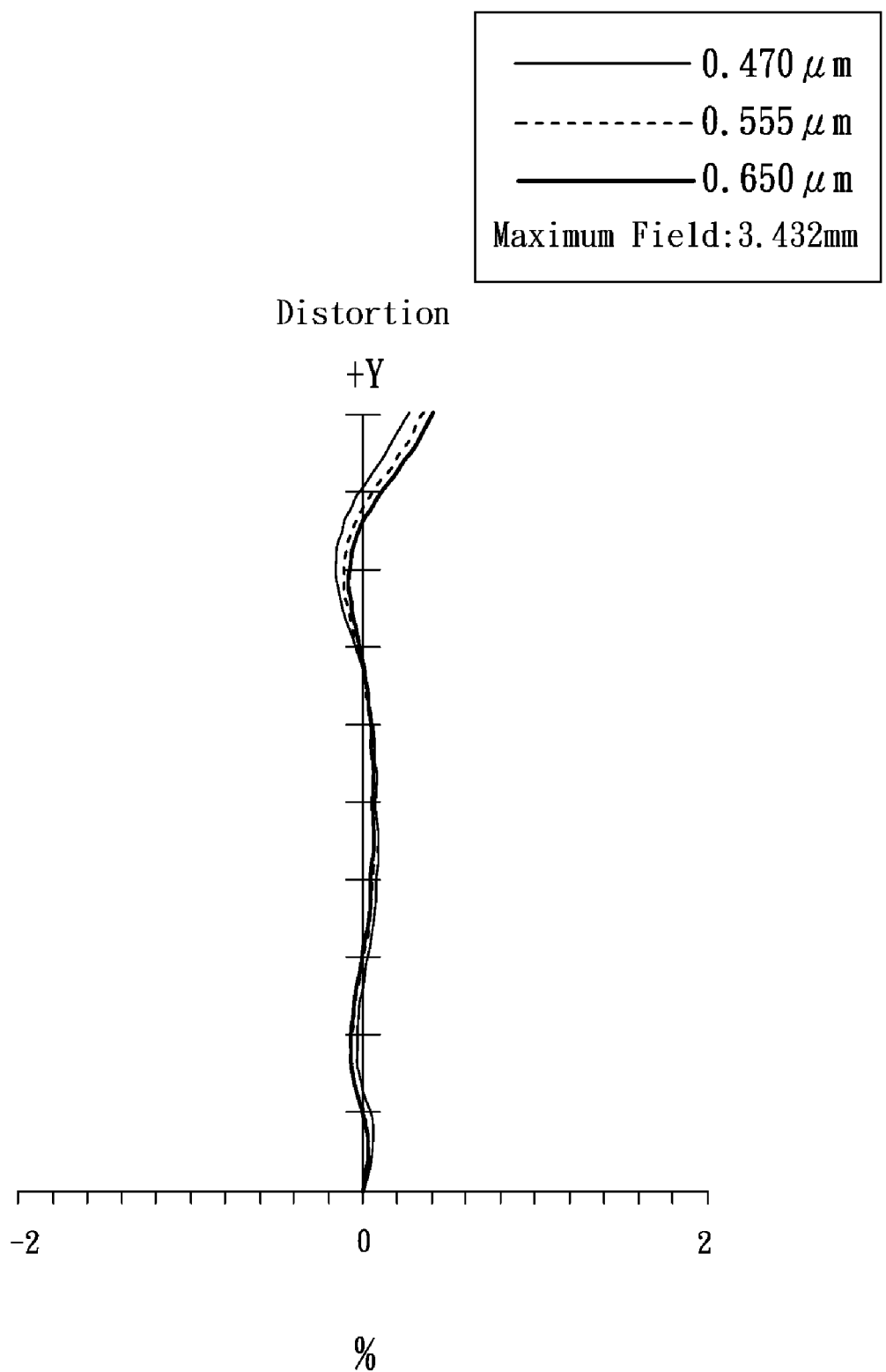
FIG. 6B is a distortion diagram of the lens assembly in accordance with the third embodiment of the invention.
Figure 6C:
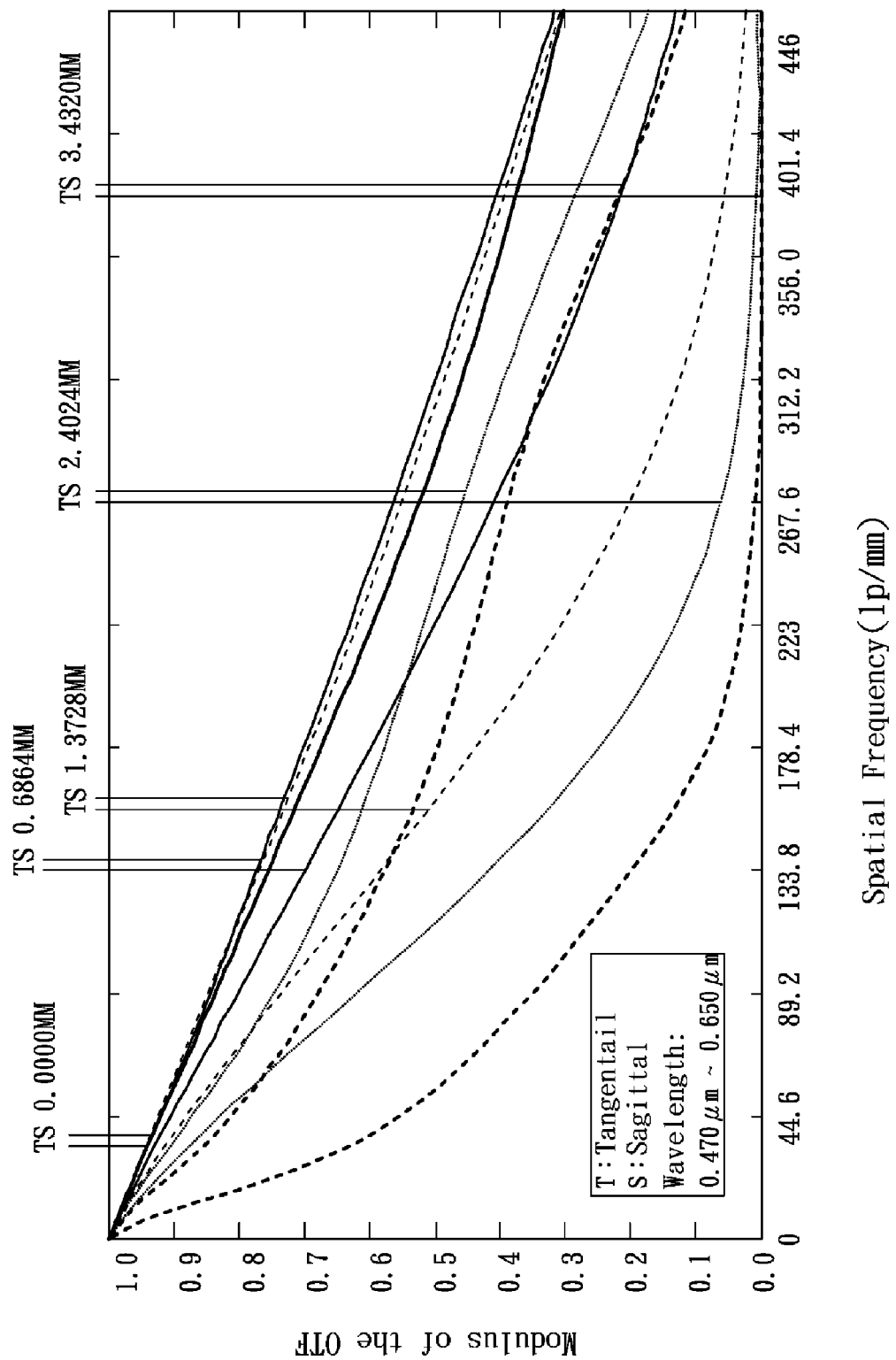
FIG. 6C is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a field curvature diagram of the lens assembly 3 in accordance with the third embodiment of the invention, FIG. 6B shows a distortion diagram of the lens assembly 3 in accordance with the third embodiment of the invention, FIG. 6C shows a modulation transfer function diagram of the lens assembly 3 in accordance with the third embodiment of the invention.

It can be seen from FIG. 6A that the field curvature of tangential direction and sagittal direction in the lens assembly 3 of the third embodiment ranges from −0.04 mm to 0.06 mm for the wavelength of 0.470 μm, 0.555 μm and 0.650 μm. It can be seen from FIG. 6B that the distortion in the lens assembly 3 of the third embodiment ranges from −0.2% to 0.4% for the wavelength of 0.470 μm, 0.555 μm, and 0.650 μm. It can be seen from FIG. 6C that the modulation transfer function of tangential direction and sagittal direction in the lens assembly 3 of the third embodiment ranges from 0.0 to 1.0 when the wavelength ranges from 0.470 μm to 0.650 μm, the fields respectively are 0.0000 mm, 0.6864 mm, 1.3728 mm, 2.4024 mm and 3.4320 mm, and the spatial frequency ranges from 0 lp/mm to 446 lp/mm. It is obvious that the field curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

In another embodiment described above, when the effective diameter of the stop ST3 can be respectively adjusted to 2.258 mm, 1.434 mm, 0.996 mm and 0.256 mm, F-number of the lens assembly 3 can be respectively changed to 1.4, 2.4, 3.4 and 13, the maximum value of $D3_{L31}/D3_{ST3}$ is equal to 10.117(2.59/0.256) and the minimum value of $D3_{L31}/D3_{ST3}$ is equal to 1.147(2.59/2.258), which satisfy the above condition (23). By changing the effective diameter of the stop ST3, which can control the amount of the incident light of the lens assembly 3 and change illuminance of image plane IMA3. On the other hand, changing the effective diameter of the stop ST3 can control depth of Field, when the greater effective diameter of the stop ST3, the shorter depth of Field. When the smaller effective diameter of the stop ST3, the longer depth of Field.

What is claimed is:

1. A lens assembly, comprising sequentially from an object side to an image side along an optical axis:
   a first lens which is a biconvex lens with positive refractive power;
   a second lens which is a meniscus lens with negative refractive power and an object side surface thereof is convex toward the object side and an image side surface thereof is concave toward the image side;
   a stop;
   a third lens which is a meniscus lens with negative refractive power and an object side surface thereof is convex toward the object side and an image side surface thereof is concave toward the image side;
   a fourth lens which is a meniscus lens with positive refractive power and an object side surface thereof is concave toward the object side and an image side surface thereof is convex toward the image side;
   a fifth lens which is a biconcave lens with negative refractive power; and
   the lens assembly satisfying the following condition:

$1.10<D_{L1}/D_{ST}<10.90$ wherein $D_{L1}$ is an effective diameter of the first lens and $D_{ST}$ is an effective diameter of the stop.

2. The lens assembly as claimed in claim 1, wherein the lens assembly satisfies:

$1.10<D_{L1}/D_{L2}<1.35$ wherein $D_{L1}$ is the effective diameter of the first lens and $D_{L2}$ is an effective diameter of the second lens.

3. The lens assembly as claimed in claim 1, wherein the lens assembly satisfies:

$Vd_1>Vd_2$, $Vd_1>Vd_3$, $Vd_4>Vd_2$, $Vd_4>Vd_3$, $Vd_5>Vd_2$, and $Vd_5>Vd_3$, wherein $Vd_1$ is an Abbe number of the first lens, $Vd_2$ is an Abbe number of the second lens, $Vd_3$ is an Abbe number of the third lens, $Vd_4$ is an Abbe number of the fourth lens and $Vd_5$ is an Abbe number of the fifth lens.

4. The lens assembly as claimed in claim 3, wherein the lens assembly satisfies:

$Vd_1>40$, $Vd_2<40$, and $Vd_5>40$, wherein $Vd_1$ is the Abbe number of the first lens, $Vd_2$ is the Abbe number of the second lens, and $Vd_5$ is the Abbe number of the fifth lens.

5. The lens assembly as claimed in claim 3, wherein the lens assembly satisfies:

$Vd_3<40$, and $Vd_4>40$, wherein $Vd_3$ is the Abbe number of the third lens and $Vd_4$ is the Abbe number of the fourth lens.

6. The lens assembly as claimed in claim 5, wherein the third lens and the fourth lens satisfies:

$$15 \leq Vd_4 - Vd_3 < 43.61$$

wherein $Vd_3$ is an Abbe number of the third lens and $Vd_4$ is an Abbe number of the fourth lens.

7. The lens assembly as claimed in claim 1, wherein the first lens, the third lens and the fourth lens satisfies:

$$-1.3 < f/f_3 + f/f_4 - f/f_1 < -0.1$$

wherein f is an effective focal length of the lens assembly, $f_1$ is an effective focal length of the first lens, $f_3$ is an effective focal length of the third lens and $f_4$ is an effective focal length of the fourth lens.

8. The lens assembly as claimed in claim 1, wherein the lens assembly satisfies:

$$0.6 < SL/TTL < 0.87$$

wherein SL is an interval from the stop to the image plane along the optical axis and TTL is an interval from an object side surface of the first lens to the image plane along the optical axis.

9. The lens assembly as claimed in claim 1, wherein the fourth lens is made of glass material.

10. The lens assembly as claimed in claim 9, wherein the first lens is made of plastic material, the second lens is made of plastic material, the third lens is made of plastic material and the fifth lens is made of plastic material.

11. The lens assembly as claimed in claim 1, wherein the stop includes an optical opening, wherein a size of an effective diameter of the stop varies depending on change of a diameter of the optical opening.

12. The lens assembly as claimed in claim 11, wherein the lens assembly satisfies:

$$1.4 \leq F \leq 13$$

wherein F is a F-number of the lens assembly.

* * * * *